United States Patent
Montessoro

(10) Patent No.: US 8,964,759 B2
(45) Date of Patent: Feb. 24, 2015

(54) METHOD FOR DIRECT ACCESS TO INFORMATION STORED IN NODES OF A PACKET SWITCHING NETWORK

(75) Inventor: Pier Luca Montessoro, Faedis (IT)

(73) Assignee: Universita Degli Studi di Udine, Udine (IT)

( * ) Notice: Subject to any disclaimer, the term of this patent is extended or adjusted under 35 U.S.C. 154(b) by 162 days.

(21) Appl. No.: 13/876,637

(22) PCT Filed: Sep. 29, 2011

(86) PCT No.: PCT/IB2011/054281
§ 371 (c)(1),
(2), (4) Date: Mar. 28, 2013

(87) PCT Pub. No.: WO2012/042491
PCT Pub. Date: Apr. 5, 2012

(65) Prior Publication Data
US 2013/0194971 A1 Aug. 1, 2013

(30) Foreign Application Priority Data

Sep. 29, 2010 (IT) .............................. UD2010A0178

(51) Int. Cl.
*H04L 12/28* (2006.01)
*H04L 12/721* (2013.01)
*H04L 12/751* (2013.01)
*H04L 12/723* (2013.01)

(52) U.S. Cl.
CPC ............... *H04L 45/44* (2013.01); *H04L 45/02* (2013.01); *H04L 45/34* (2013.01); *H04L 45/507* (2013.01); *H04L 45/566* (2013.01)
USPC .................. 370/395.31; 370/392; 370/395.7; 710/22

(58) Field of Classification Search
CPC ....... H04L 45/00; H04L 45/745; H04L 49/25; H04L 49/3009; H04L 49/90; H04L 45/34; H04L 45/44; H04L 45/54; H04Q 2213/13541
USPC ................. 370/389, 392, 393, 395.3, 395.31, 370/395.32, 235, 395.7; 709/217, 218, 219; 710/22, 26; 711/216, 217, 218
See application file for complete search history.

(56) References Cited

U.S. PATENT DOCUMENTS

| | | | |
|---|---|---|---|
| 5,353,283 A | 10/1994 | Tsuchiya | |
| 7,260,518 B2 * | 8/2007 | Kerr et al. | ........................ 703/27 |
| 2005/0201398 A1 * | 9/2005 | Naik et al. | .................... 370/412 |

OTHER PUBLICATIONS

International Search Report and Written Opinion corresponding to PCT/IB2011/054281, mail date of Feb. 13, 2012.

*Primary Examiner* — Edan Orgad
*Assistant Examiner* — Ivan O Latorre
(74) *Attorney, Agent, or Firm* — LeClairRyan, a Professional Corporation

(57) ABSTRACT

Method for direct access to information stored in the nodes of a packet switching network comprises the steps of: collecting the pointers, corresponding to which the information required for processing the packets belonging to one and the same flow is stored in each node of the network;—constructing a distributed linked data structure (DLDS) in which the pointers are contained inside packets (PI, P2, P3) that traverse the DLDS-aware routers constituting the path between sender (A) and receiver (B) of the flow;—use of the DLDS data structure for direct access to the information stored in a DLDS-aware router, using a pointer of the DLDS contained in the packet in transit;—selection of the pointer of the DLDS contained in the packet in transit based on its position inside said packet, said position being equal to the serial number of the DLDS-aware router in the flow path, and checking of validity by consistency tests.

11 Claims, 10 Drawing Sheets

DLDS in the case of stateful routers

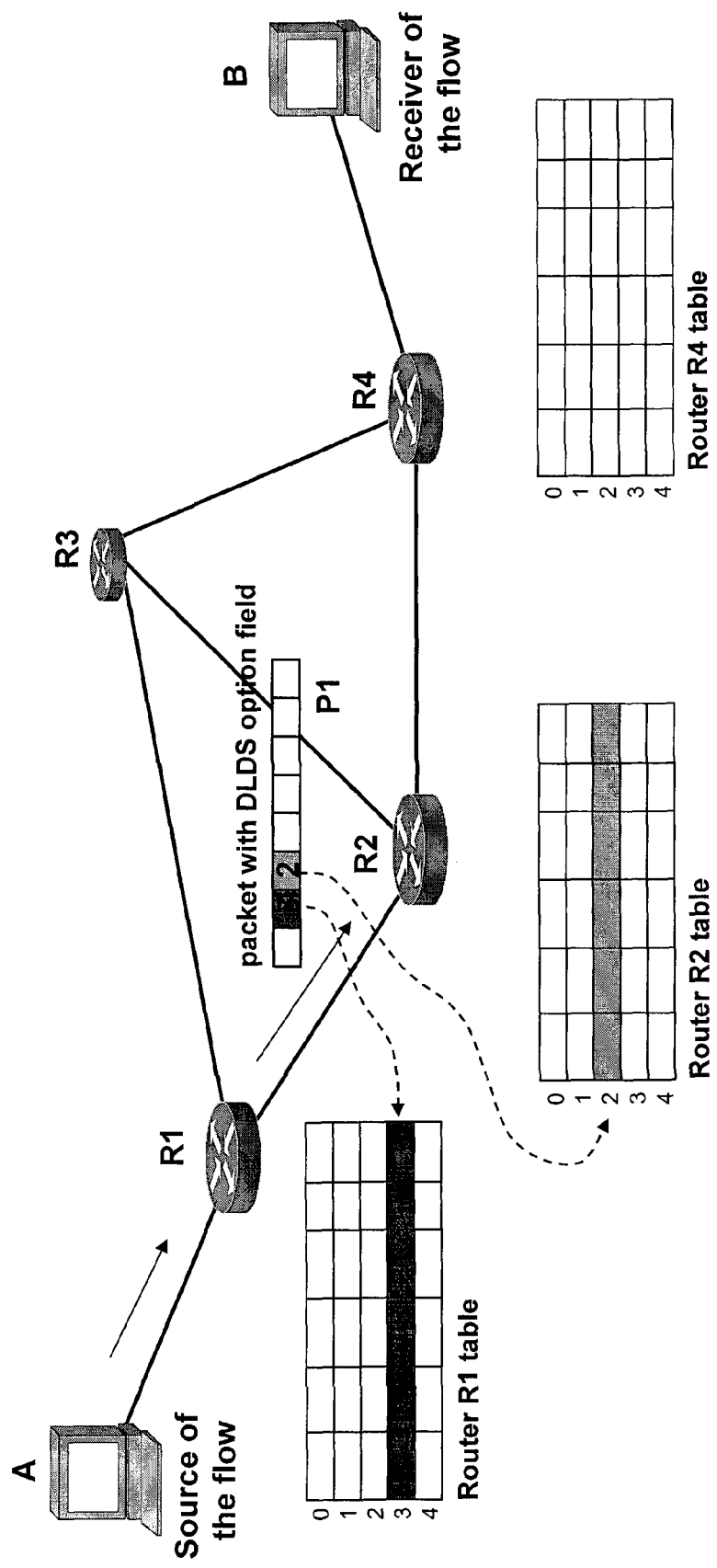
Figure 1a: address collection by "forward pointers collection"

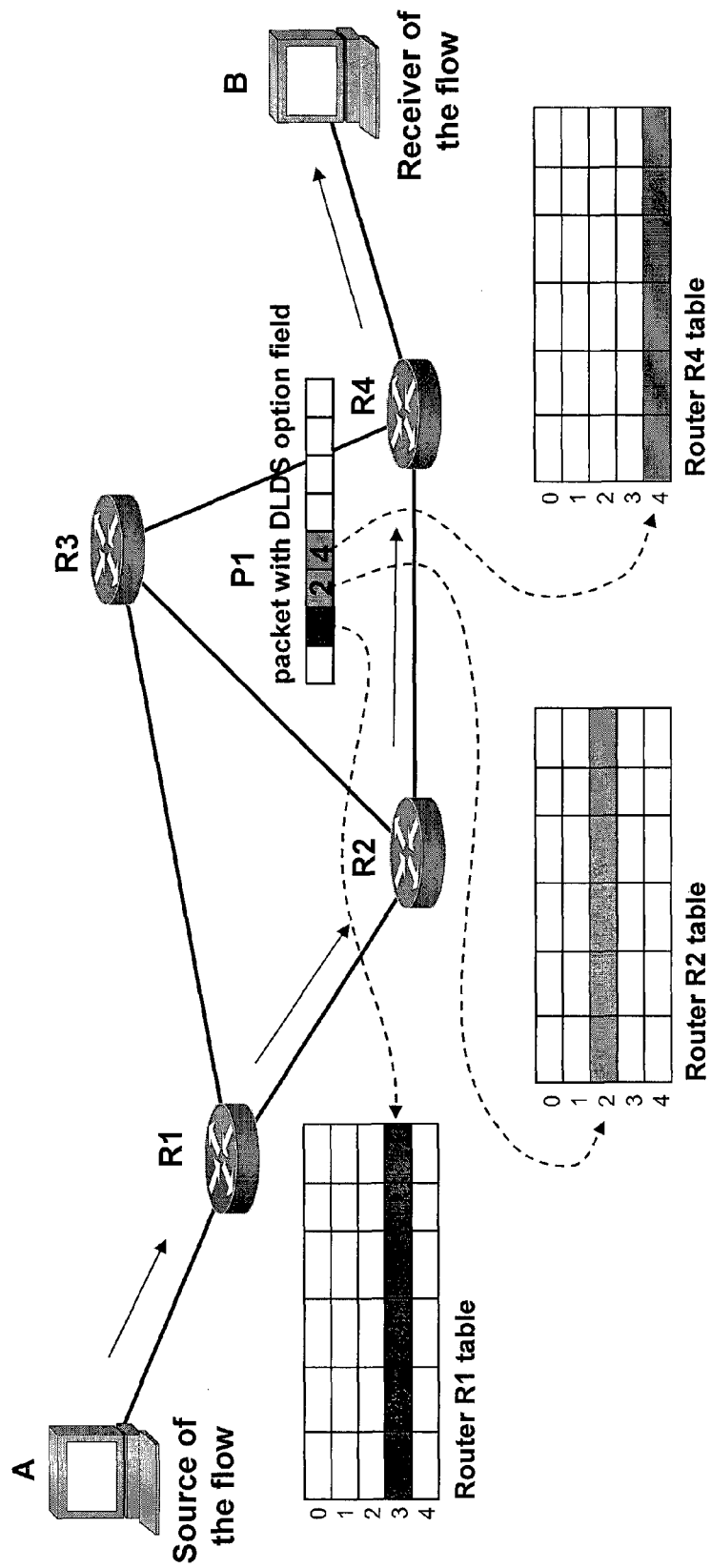
Figure 1b: address collection by "forward pointers collection"

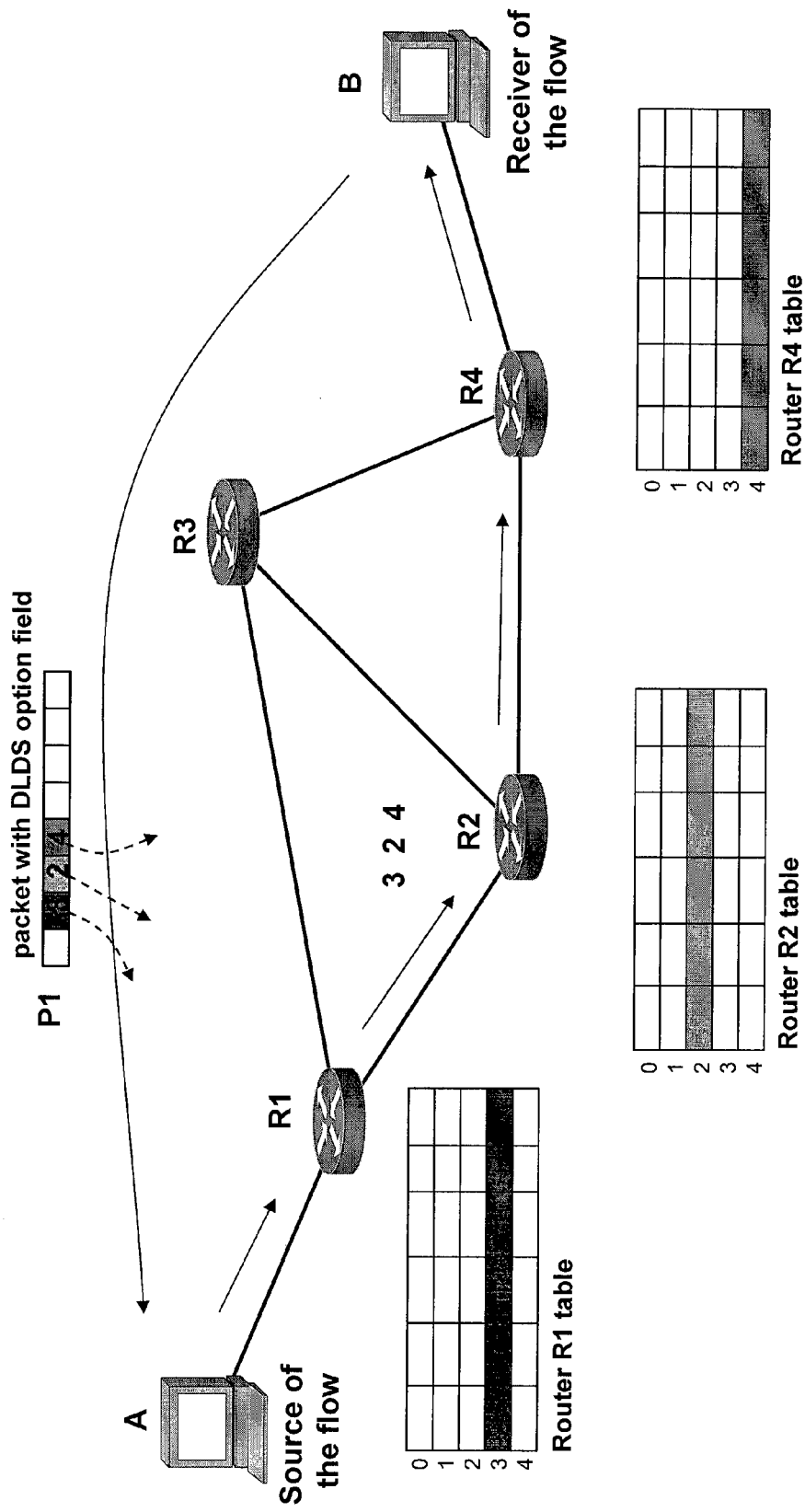
Figure 1c: address collection by "forward pointers collection"

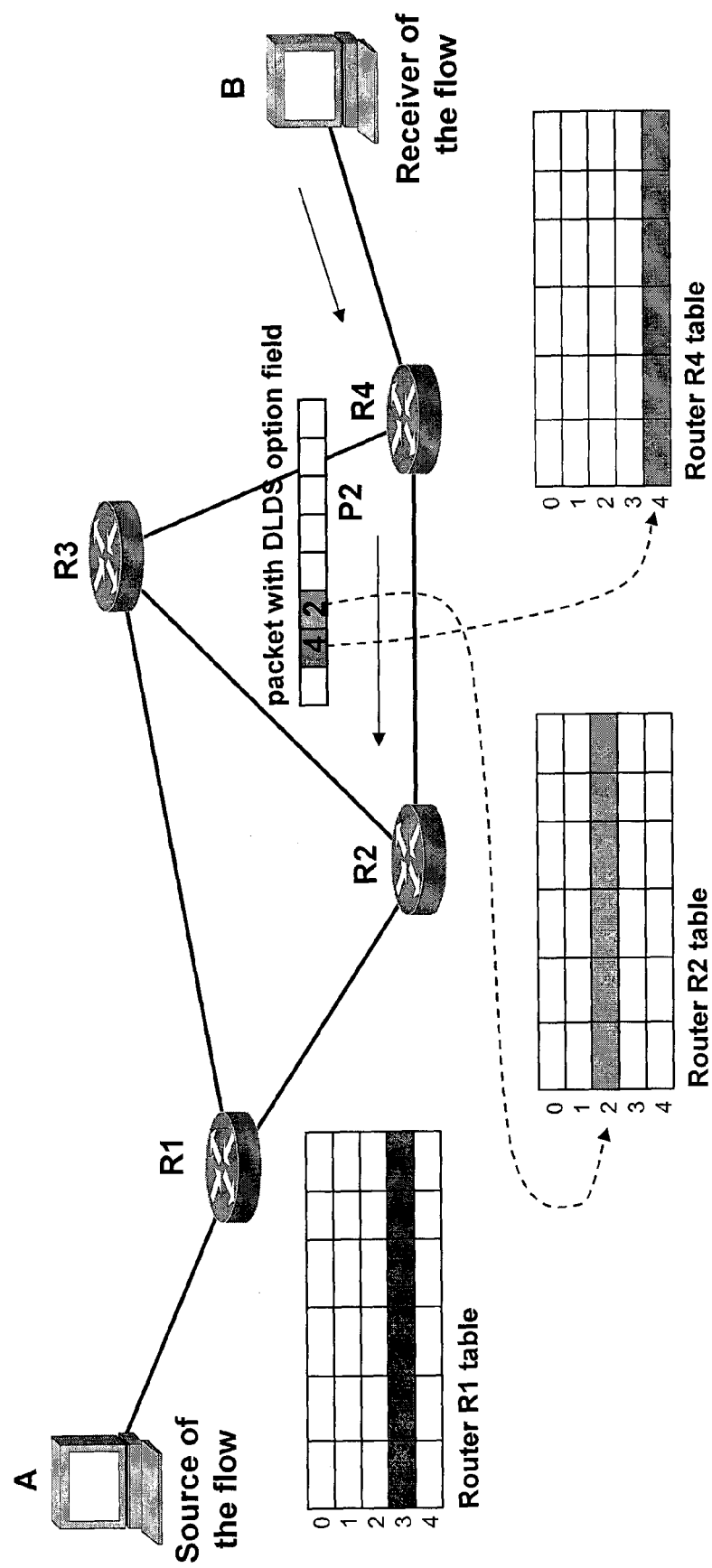
Figure 2a: address collection "backward pointers collection"

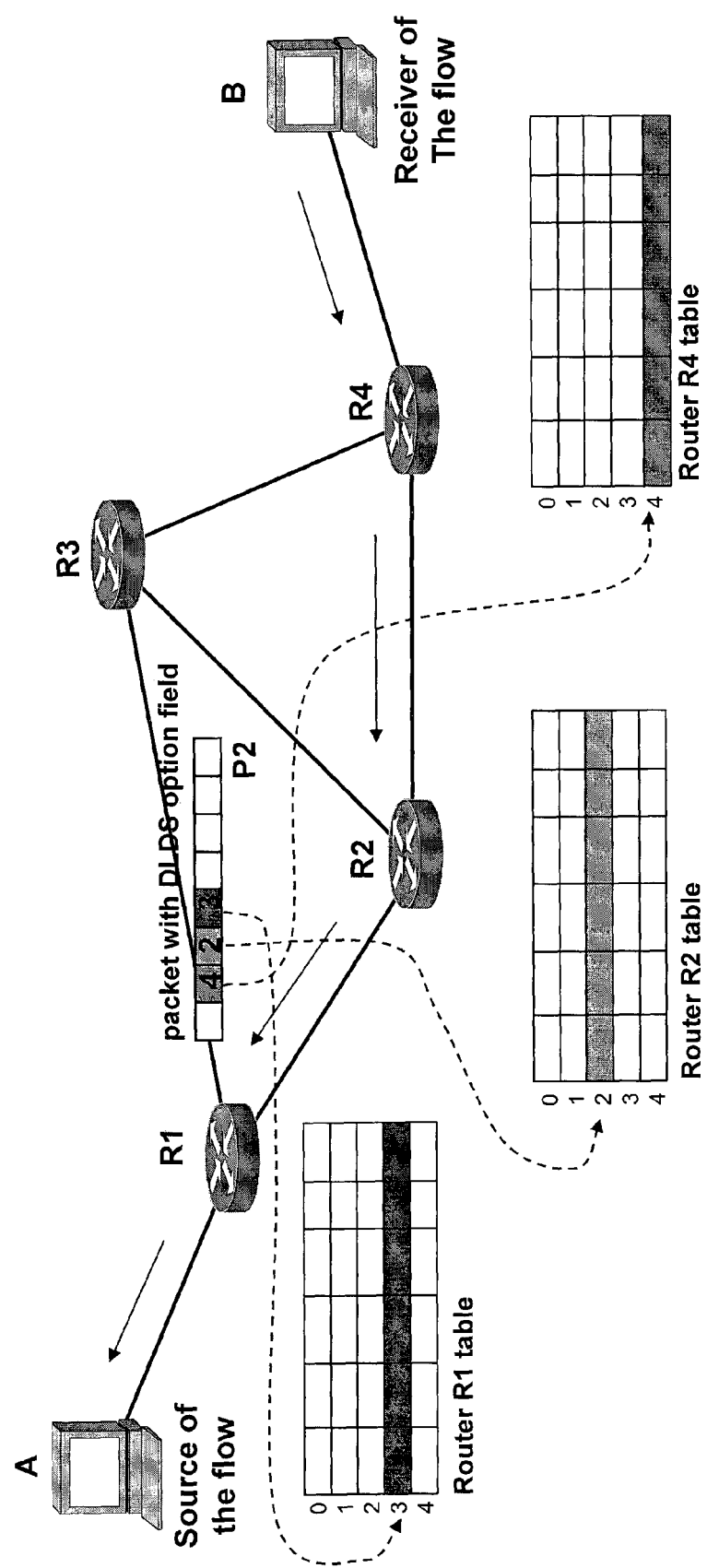
Figure 2b: address collection by "backward pointers collection"

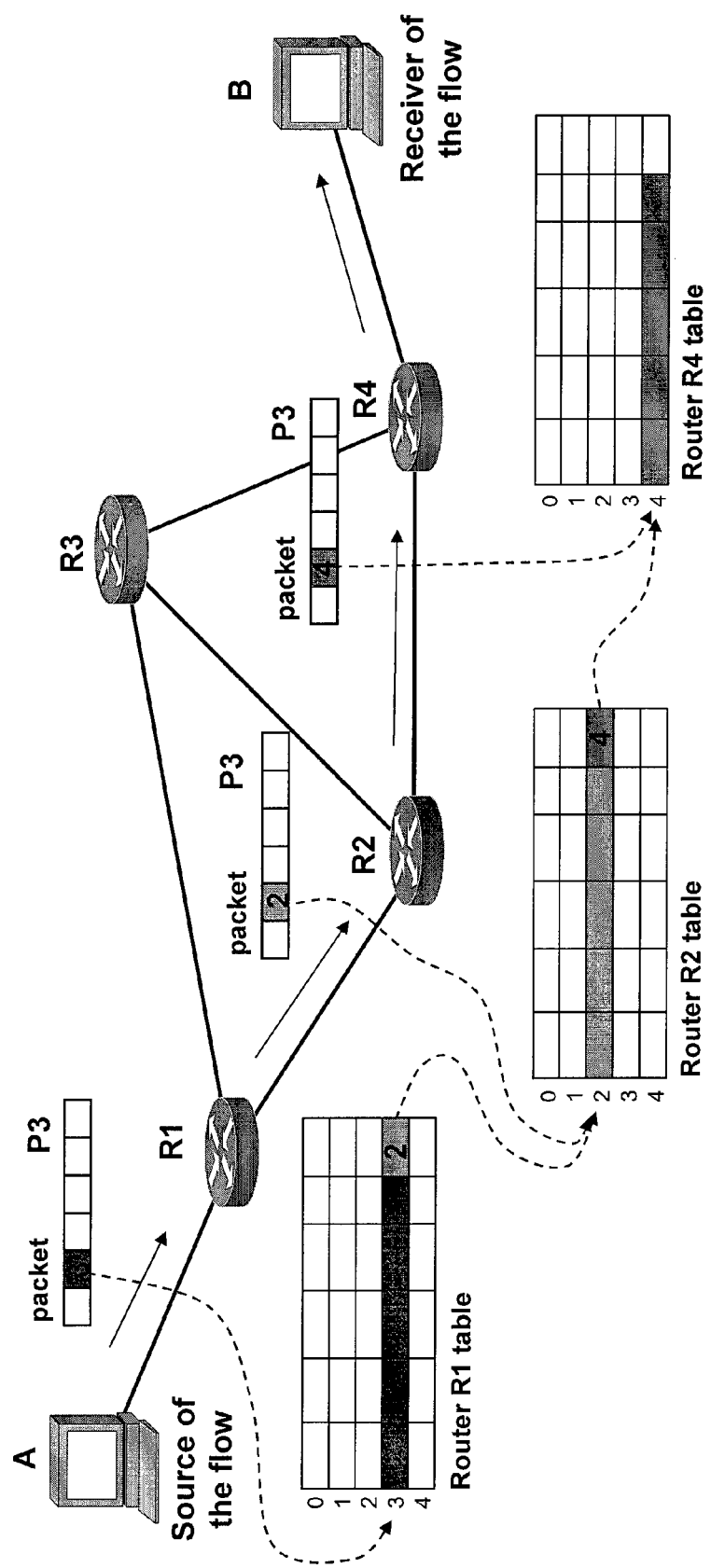
Figure 3: DLDS in the case of stateful routers

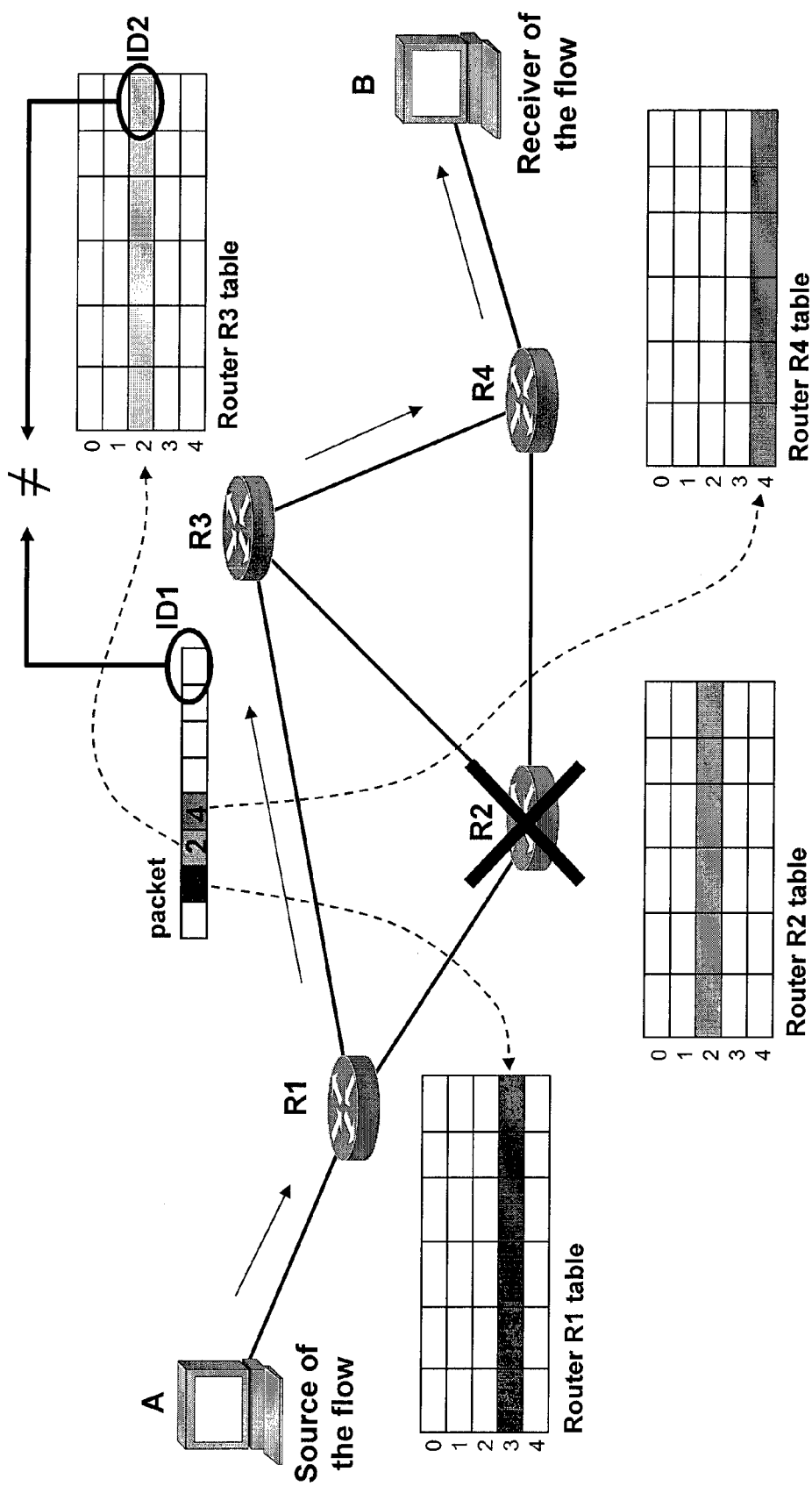
Figure 4: consistency check in the case of change in routing (stateless router)

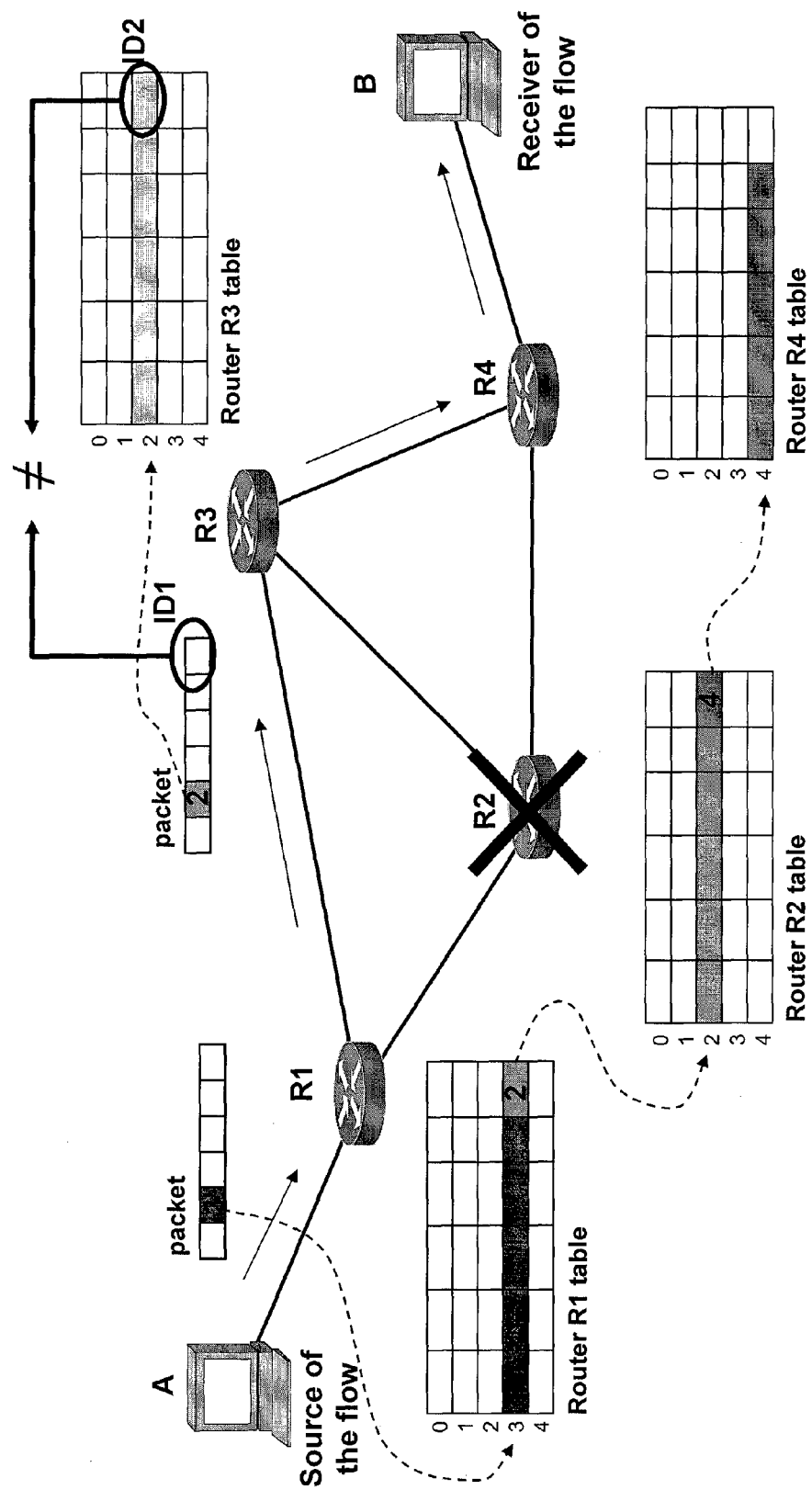
Figure 5: consistency check in the case of change in routing (stateful router)

Figure 6: algorithm for using the DLDS and consistency check

1. increment the hop counter in the packet;
2. perform the consistency check:
   - 2a. check if the current hop counter is within the path length;
   - 2b. check if the pointer addressed using the hop counter as index is within the router's table size;
   - 2c. check if the destination in the table entry is still the same on the packet;
3. if the consistency check fails:
   - 3a. invalidate the DSDS option field;
   - 3b. perform a conventional table lookup;
4. forward the packet.

Figure 7: example of implementation in C language of use of the DLDS of the consistency check

```
ptr_index = pckt.DLDSopt.hop_cnt++;
if ( ptr_index > pckt.DLDSopt.path_len ||
     (ptr = pckt.DLDSopt.pointers[ptr_index]) > MAXptr ||
     ptr->dst != pckt.dst)
{
    /* invalidate the DLDS option field */
    pckt.DLDSopt.path_len = -1;
    ptr = table_lookup (pckt.dst);
}
forward_to (ptr->port);
```

METHOD FOR DIRECT ACCESS TO INFORMATION STORED IN NODES OF A PACKET SWITCHING NETWORK

This application is a national stage application under 35 U.S.C. 371 of PCT Application No. PCT/IB2011/054281, filed Sep. 29, 2011, which claims the benefit of Italy Patent Application No. UD2010A000178, filed Sep. 29, 2010, each of which is hereby incorporated by reference in its entirety.

FIELD OF THE INVENTION

The present invention relates to a method for direct access to information stored in the nodes of a packet switching network, as expressed and characterized in the main claim.

The subclaims disclose other characteristics of the present invention or variants of the idea of the main solution.

The present invention also relates to equipment for implementing the aforesaid method.

PRIOR ART

For example, the prior document U.S. Pat. No. 5,353,283 is known in this technical field. The purpose of the present invention is to provide a method of access to information that is quicker than is described for example in the cited prior document.

SUMMARY

In accordance with the aforementioned purpose, according to the present invention, the method envisages (for every flow of data) interaction between three types of devices: one or more senders, one or more receivers, one or more intermediate nodes (DLDS-aware routers) in which the specific functionalities for the operation of the present method have been added to the classical functionalities of packet switching.

As mentioned, the method supplies better performance, the more numerous the packets that make up the flow of data. The basic principle of operation is as follows. The sender sends a first data packet, containing a special field called hereinafter empty DLDS option (optional field "Distributed Linked Data Structure"), able to hold the memory addresses that will gradually be written there by the routers traversed. The DLDS option field also contains a counter of the number of DLDS-aware routers traversed, initially set at 0.

The first DLDS-aware router receives the packet and performs the usual operations of searching for the data necessary for managing and forwarding the packet. These operations will lead to identifying the position in memory where the information was found. The DLDS-aware router at this point stores this address in the DLDS option field of the packet in position 0 (indicated by the counter of the DLDS-aware routers traversed and corresponding in fact to the first DLDS-aware router of the path to the destination) and increments the counter of DLDS-aware routers traversed. The packet is then passed to the next DLDS-aware router. The second DLDS-aware router will perform operations similar to the preceding and will store, this time in position 1, corresponding to the current value of the counter of the DLDS-aware routers traversed, the memory address where the information required for managing the packet is located. The counter of DLDS-aware routers traversed is incremented again and the packet is forwarded to the next DLDS-aware router. At end of this process the packet that reaches the destination) contains, in the order of traversing the DLDS-aware routers, all the addresses at which the information that the DLDS-aware routers needed to find for managing said packet is located. At this point the receiver sends a message containing this list of addresses to the sending node. The sender will include, in the successive packets belonging to the same flow, a new DLDS option field, this time full, containing the addresses received. The DLDS-aware routers, on receiving said packets, will be able to access the information directly without further activation of the search procedures since the DLDS option field supplies the memory addresses at which said information is located.

Obviously this technique functions as long as the routing is stable, i.e. as long as the sequence of DLDS-aware routers traversed remains the same. If a packet containing the pointers in the DLDS option field is routed to a DLDS-aware router different from those traversed earlier, the memory address that the new DLDS-aware router will try to use will not be correct. In order to recognize this situation, before using the memory address, a "consistency test" is performed that prevents the DLDS-aware router using a pointer not referred to its own memory. The consistency test supplies the result FALSE (i.e. the memory address is no longer usable) if: 1) the memory address points to a position outside the table, or 2) the information taken from the table at the position indicated by the memory address does not correspond to the information sought, specified inside the packet. For example, in relation to the second part of the test, in the case of application for reservation of resources, the flow identifier found in the table does not correspond to that of the packet; in the case of application for fast, direct access to the routing table, the destination address extracted from the table is different from that contained in the packet.

Collection of the memory addresses based on a DLDS can take place in two directions, depending on the characteristics of the network protocol using it. In the "forward pointers collection" mode, address collection takes place from the sender of the flow to the receiver and at the end the receiver sends a packet containing the addresses collected to the sender, as described above. If, however, routing is symmetrical, i.e. if the check packets sent by the receiver of the flow to the sender take the same path, backwards, as the packets belonging to the flow, it is possible to use the "backward pointers collection" mode, in which it is the receiver that sends the collection, at the end of which the collection of addresses is dispatched by the last router traversed (the first of the path that will be followed by the flow) to the sender; this avoids the need for final sending of the packet containing the addresses, as occurs for the "forward pointers collection" mode. Moreover, this mode is compatible with standard Internet protocols such as RSVP.

A further variant in the structure of a DLDS consists of storing each memory address in the router preceding that to which said address refers, rather than in a single packet. This requires that every router is "stateful" (rather than "stateless"), i.e. stores information relating to each active flow. This already occurs, with other objectives, in many implementations of routers and is also based on application of the same DLDS for reservation of resources. With this variant, the packet will contain, in the DLDS option field, a single address, which will be replaced with the next address each time a DLDS-aware router is traversed. In the case of the "forward pointers collection" mode, storage of the memory addresses inside each "stateful" router will take place by a suitable backward message sent from each router traversed; in the case of the "backward pointers collection" mode, address storage will take place without additional messages since the packet containing the DLDS option for the address collection passes backwards through the routers of the flow path, then immediately delivers each address to the "stateful" router that is to store it.

DESCRIPTION OF THE DRAWINGS

These and other characteristics of the present invention will become clear from the following description of a preferred embodiment, given as a non-limiting example, referring to the appended drawings in which:

FIGS. 1a, 1b and 1c describe the operation of the "DLDS-aware router" equipment during the "forward pointers collection" phase in an example network made up of two hosts (computers, for example) having the role of sender and receiver of the flow and four "DLDS-aware routers";

FIGS. 2a and 2b describe, on the same example network, the operation of the "DLDS-aware router" equipment during the "backward pointers collection" phase;

FIG. 3 illustrates the operation of the DLDS in normal conditions, i.e. following collection of the addresses, in the case of "stateful" routers.

FIG. 3 shows, for the same example network, storage of the memory addresses in the "stateful" routers;

FIG. 4 shows, for the same example network, constructed with "stateless" routers, the effect of the consistency check in the case of a change of the path on which the packets belonging to the flow under consideration are routed by the dynamic routing algorithms;

FIG. 5 shows, for the same example network, constructed with "stateful" routers, the effect of the consistency check in the case of a change of the path on which the packets belonging to the flow under consideration are routed by the dynamic routing algorithms;

FIG. 6 presents the algorithm for use of the DLDS and for the consistency check;

FIG. 7 presents an example of implementation in C language of the use of the DLDS and of the consistency check.

DESCRIPTION OF A PREFERRED EMBODIMENT

According to the present invention, the drawings show four DLDS-aware routers with the reference labels R1, R2, R3, the sender of the flow with the reference label A and the receiver of the flow with the reference label B.

FIGS. 1a and 1b illustrate how the memory addresses, which point to the information that was accessed in each router for processing the packet in transit, are collected in the packet P1. The same information will also serve for all subsequent packets belonging to the same flow.

FIG. 1c shows how the packet P1, at the end of address collection, is sent to the host A, the sender of the flow, so that the latter can store these addresses and insert them in subsequent packets.

FIGS. 2a and 2b illustrate the same collection of addresses, in packet P2, with the "backward pointers collection" mode. The addresses sent to host A will be in reverse order relative to the sequence of routers traversed by the packets of the flow.

FIG. 3 illustrates the operation of the DLDS in normal conditions, i.e. following collection of the addresses, in the case of "stateful" routers. Packet P3 contains only one address at a time.

FIG. 4 illustrates the operation of the DLDS in normal conditions, i.e. following collection of the addresses, in the case of "stateful" routers. Packet P3 contains only one address at a time.

FIG. 4 illustrates the consistency test in the case of DLDS constructed with "stateless" routers. After router R2 is switched off, the packets of the flow are routed by R1 to R3, instead of to R2 as occurred previously. Consequently, the packet in R3 will contain, in the second position (considering the second router traversed), the memory address 2, which however relates to information stored in router R2. Before using the information thus addressed, the consistency test is performed: the identifier ID1 contained in the packet (for example flow identifier or final destination address of the packet, depending on the application, as already discussed) is compared with the identifier ID2 contained in memory at the address present in the packet. If these identifiers do not correspond, the address is invalidated and a normal table look-up operation is started.

FIG. 5 illustrates the operation of the consistency test in a situation similar to that of FIG. 4 but in the case of "stateful" routers.

FIG. 6 presents the algorithm for use of the DLDS and for the consistency check.

FIG. 7 presents an example of implementation in C language for use of the DLDS and of the consistency check.

In accordance with the present invention, a method for direct access to information stored in the nodes of a packet switching network comprises the steps of:

collecting the memory addresses, corresponding to which the information necessary for processing the packets belonging to one and the same flow is stored at each node of the network (the DLDS-aware routers R1, R2, R3 and R4, devices of the present invention);

constructing a distributed linked data structure (DLDS) in which the pointers (the memory addresses collected in the preceding phase) are contained inside packets (P1, P2, P3) that traverse the DLDS-aware routers constituting the path between sender (A) and receiver (B) of the flow;

using said DLDS data structure for direct access (i.e. without performing searches) to the information stored in a DLDS-aware router, using a pointer of the DLDS contained in the packet in transit;

selection of the pointer of the DLDS contained in the packet in transit based on its position in the sequence contained in said packet, the position being equal to the serial number of the DLDS-aware router in the flow path (this serial number is stored in the packet by a counter of the DLDS-aware routers traversed and is incremented by each DLDS-aware router before forwarding the packet).

In the pointer selection phase, the pointer to be used is selected on the basis of criteria different from the position of the DLDS-aware router in the flow path, it being understood that the pointer selected, in the absence of faults or changes of routing, must point to a memory address inside the very same router.

The distributed linked data structure can be organized in any one of the following ways:

the pointers collected in the initial phase are stored in the sender node and inserted in the packets sent along the flow path;

the pointers collected in the initial phase are stored in the DLDS-aware routers immediately preceding those to which each pointer refers;

the pointers are stored partly in the sender and receiver nodes and partly in the DLDS-aware routers adjacent to those to which each pointer refers.

In the case when the pointers are stored at least partly in the DLDS-aware routers:

during operation in normal conditions the packets will contain only one or only some of the pointers constituting the DLDS; these pointers will partly be replaced with those required for the next DLDS-aware routers during the progression of the packets along the flow path;

a DLDS-aware router can autonomously send a packet to an adjacent DLDS-aware router to transmit a pointer that refers to its memory space (or of the DLDS-aware router that sends the message).

The memory addresses constituting the DLDS can be collected in any one of the following ways:

forward collection ("forward pointers collection"), in which the sending node starts the collection by sending a packet containing a suitable DLDS field, and each DLDS-aware router traversed, after seeking and finding the information of interest of the flow or of the single packet in its own tables, stores the address of this information in the packet in transit; the packet is finally received by the receiver, which sends the addresses collected (packet P1 in FIG. 1c) to the sending node for subsequent use in normal conditions;

forward collection with DLDS-aware "stateful" routers, variant of the procedure just described, in which the address is not stored in the packet in transit, but is sent to the immediately preceding DLDS-aware router in the flow path (or to the sender, if considering the first DLDS-aware router of the path) and is stored therein;

backward collection ("backward pointers collection"), in which the node receiving the flow starts the address collection phase; the packet containing the suitable DLDS field passes backwards through the DLDS-aware routers of the flow path which, after seeking and finding the information of interest of the flow or of the single packet in their own tables, store the address to said information in the DLDS field of the packet in transit; the packet is finally received by the sender of the flow which, in normal conditions, will use the addresses collected, inserting them in the next packets;

backward collection with DLDS-aware "stateful" routers, variant of the procedure just described, in which only one address at a time is stored in the packet in transit; the packet is then transmitted to the preceding DLDS-aware router in the flow path (or to the sender, if considering the first DLDS-aware router of the flow path) and the address is stored therein; in the packet, this address is then replaced with that relating to the information in the current DLDS-aware router and the packet is forwarded to the preceding DLDS-aware router (onto the node sending the flow) in the flow path, where the process is repeated.

The memory addresses (pointers):

can be replaced with indices in tables or other values or data types suitable for obtaining direct access to the stored information.

The sender and receiver nodes can be:

hosts (computers, servers, etc.) of the network;

DLDS-aware routers which, traversed by packets without the DLDS field, decide autonomously to insert it and manage it by performing the procedures described up to now for sender and receiver;

firewalls or other devices for management and control of the network traffic which, by managing information on the flows aimed at safety and control of the traffic, can also manage the DLDS relating to said flows;

proxy servers which, on receiving from the nodes of the network that they serve, requests for access to external information, autonomously start the phase of construction and management of the DLDS, acting to all intents and purposes as the sender and receiver nodes described above.

The network need not be constituted exclusively of DLDS-aware routers and of sender and receiver nodes able to manage the DLDS:

the role of sender and receiver can be played by nodes different from the hosts, as stated in the preceding claim;

optional routers or other types of equipment of the network that are not "DLDS-aware" do not interact with the method according to the present invention and for the purposes of management of the DLDS behave as simple physical connections. In the phase of use of the DLDS data structure the use of each pointer for accessing the information without search procedures is subject to a consistency test, which may return the value FALSE if the pointer points to a position outside the table addressed or if the information taken from the table at the position indicated by the pointer does not correspond to the information sought, specified inside the packet in transit.

The present invention can moreover be used for constructing a computer program, directly loadable in the memory of a digital computer, comprising portions of software code suitable for executing the steps described above when said product is carried out on one or more computers, or for constructing one or more digital devices that are to implement the steps described above by means of hardware functions.

The invention claimed is:

1. A method for direct access to information stored in nodes of a packet switching network, wherein said method comprises the steps of:
    collecting pointers to memory locations at which information necessary for processing packets belonging to a same flow is stored in each node of the network;
    constructing a distributed linked data structure (DLDS) in which the pointers are contained inside packets that traverse nodes constituting a flow path between a sender node and a receiver node;
    using said DLDS for direct access to the information stored in a node in the flow path, using a pointer of the DLDS contained in a packet in transit; and
    selecting the pointer of the DLDS contained in the packet in transit based on a position of the pointer in a sequence contained in said packet, said position being equal to a serial number of the node in the flow path.

2. The method according to claim 1, wherein the pointer is further selected on the basis of criteria different from the position of the node in the flow path, the pointer selected pointing to a memory address inside the node.

3. The method according to claim 1, wherein:
    the pointers collected are stored in the sender node and inserted in the packets sent along the flow path;
    the pointers collected are stored in a subset of the nodes immediately preceding those to which each pointer refers; or
    the pointers collected are stored partly in the sender and receiver nodes and partly in a subset of the nodes adjacent to those to which each pointer refers.

4. The method according to claim 3, wherein when the pointers are stored at least partly in the subset of the nodes immediately preceding or adjacent to those to which each pointer refers:
    the packets contain only one or only some of the pointers constituting the DLDS, the only one or only some of the pointers being partly replaced with those required for a next one of the nodes during progression of the packets along the flow path; and
    the method further comprises autonomously sending, with one of the nodes, a packet to an adjacent one of the nodes to transmit a pointer that relates to a memory space of the one node.

5. The method according to claim 1, wherein the collecting further comprises:

sending, with the sender node, a packet containing a suitable DLDS field, wherein each of one or more nodes traversed, after seeking and finding information of interest of the flow or of a single packet in one of a plurality of stored tables, stores an address of the information in the packet in transit, or sends the address to an immediately preceding one of the nodes in the flow path to be stored thereby, and the packet is received by the receiver node, which sends the addresses collected to the sender node for subsequent use in normal conditions;

sending, with the receiver node, the packet containing the suitable DLDS field backwards through the nodes of the flow path which, after seeking and finding the information of interest of the flow or of the single packet in a respective table, store the address to said information in the DLDS field of the packet in transit, wherein the packet is received by the sender node which uses the pointers collected by inserting them in subsequent packets; or sending, with the receiver node, the packet containing the suitable DLDS field to a preceding one of the nodes in the flow path which stores the address and replaces an address in the packet with that relating to the information in the current node and forwards the packet to a preceding one of the nodes in the flow path, where the process is repeated.

6. The method according to claim 1, wherein the pointers are replaced with indices in tables or other values or data types suitable for obtaining direct access to the stored information necessary for processing packets belonging to a same flow.

7. The method according to claim 1, wherein the sender and receiver nodes are:
   hosts of the network;
   DLDS-aware routers which, when traversed by packets without the DLDS field, decide autonomously to insert a DLDS field and manage the inserted DLDS field
   firewalls or other devices for management and control of network traffic which, by managing information on flows aiming at safety and traffic control, also manage a DLDS relating to said flows; or
   proxy servers which, on receiving, from nodes of the network that are served by them, requests for access to external information, autonomously start the constructing step acting as the sender and receiver nodes.

8. The method according to claim 7, wherein the network is not be constituted exclusively of the nodes and of sender and receiver nodes able to manage the nodes:
   steps performed by the sender and receiver nodes can be performed by nodes different from the hosts of the network;
   optional routers or other types of network equipment that do not interact with any of the steps of the method and for the purposes of DLDS management behave according to physical connections.

9. The method according to claim 1, wherein the using further comprises for each pointer accessing the information without search procedures and subject to a consistency test which may return FALSE if the pointer points to a position outside a table addressed or if the information taken from the table at a position indicated by the pointer does not correspond to information specified inside the packet in transit.

10. A computer program product, directly loadable in the memory of a computer, comprising portions of software code which when carried out by a processor of the computer are configured to perform steps comprising:
   collecting pointers to memory locations at which information necessary for processing packets belonging to a same flow is stored in each node of the network;
   constructing a distributed linked data structure (DLDS) in which the pointers are contained inside packets that traverse nodes constituting a flow path between a sender node and a receiver node;
   using said DLDS for direct access to the information stored in a node in the flow path, using a pointer of the DLDS contained in a packet in transit; and
   selecting the pointer of the DLDS contained in the packet in transit based on a position of the pointer in a sequence contained in said packet, said position being equal to a serial number of the node in the flow path.

11. A network including a plurality of nodes, each node having a processor and a memory configured to execute the steps of:
   collecting pointers to memory locations at which information necessary for processing packets belonging to a same flow is stored in each node of the network;
   constructing a distributed linked data structure (DLDS) in which the pointers-are contained inside packets that traverse nodes constituting a flow path between a sender node and a receiver node;
   using said DLDS for direct access to the information stored in a node in the flow path, using a pointer of the DLDS contained in a packet in transit; and
   selecting the pointer of the DLDS contained in the packet in transit based on a position of the pointer in a sequence contained in said packet, said position being equal to a serial number of node in the flow path.

* * * * *